Patented Apr. 8, 1930

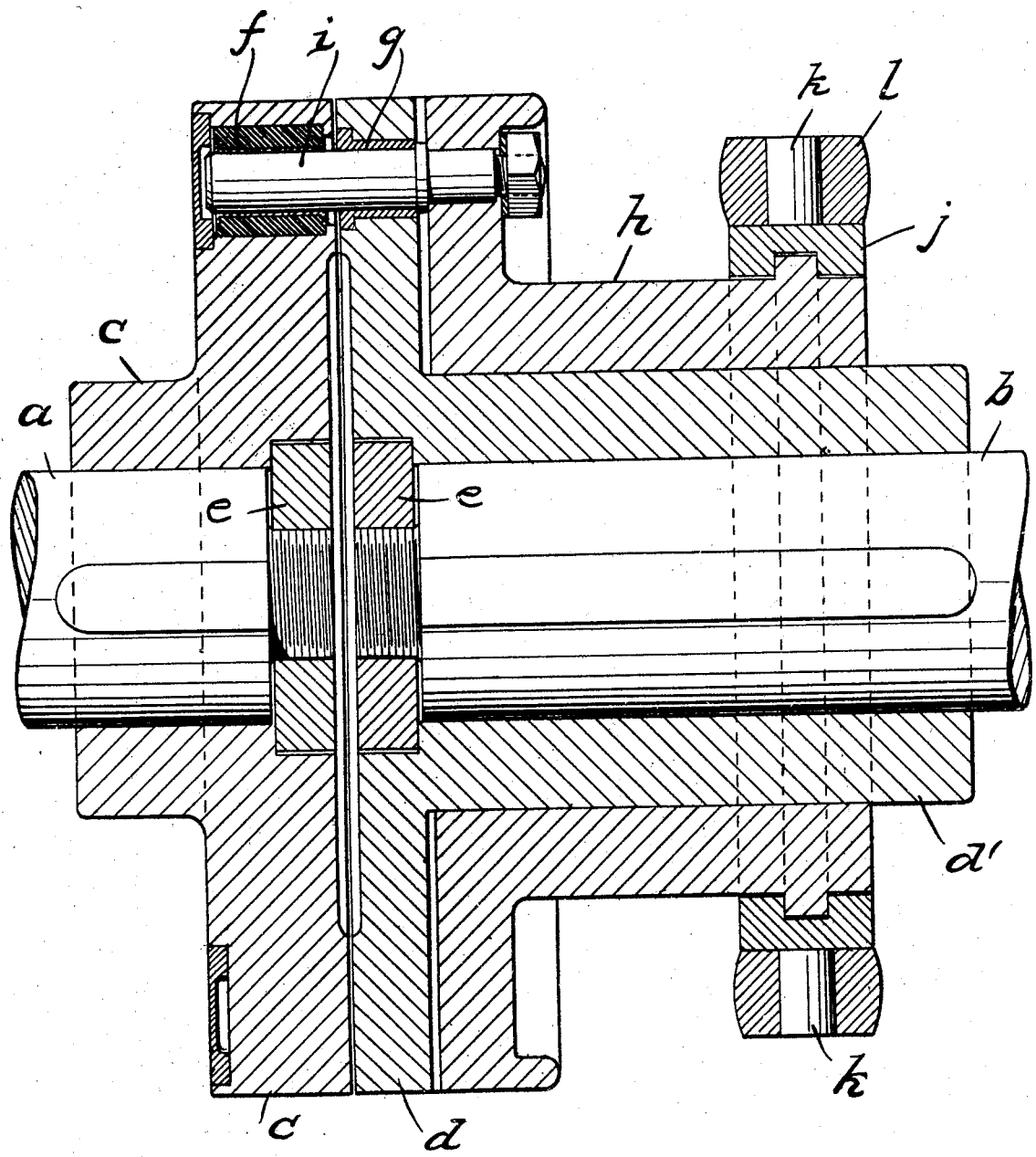

1,753,300

UNITED STATES PATENT OFFICE

ARVID PETERSON, OF TRENTON, NEW JERSEY, ASSIGNOR TO DE LAVAL STEAM TURBINE COMPANY, OF TRENTON, NEW JERSEY, A CORPORATION OF NEW JERSEY

DISCONNECTING COUPLING

Application filed March 5, 1927. Serial No. 172,946.

My invention relates to disconnecting couplings such as are used for connecting and disconnecting a drive shaft and a shaft to be driven.

Heretofore disconnecting couplings have been constructed in two parts having interengaging jaws, or pins and holes, one of the parts being fixedly mounted on one of the shafts and the other being slidably keyed on the other shaft so as to be movable into and out of engagement with the fixedly mounted part.

Couplings comprising two members, one of which is slidable, are disadvantageous since the slidable member, which is necessarily loose on the shaft and also on the keyway, is subjected to excessive wear and becomes looser and looser with the result that frequent replacement is necessary. Couplings of the type heretofore known are especially disadvantageous when used for the transmission of power from reciprocating engines, such as steam engines and internal combustion engines, where the torque is uneven and where, therefore, a certain amount of hammering takes place which increases the rapidity of wear on the slidable member of the coupling.

Now, it is the object of my invention to provide a coupling so constructed that wear will be practically eliminated and which will permit of the coupling being so constructed as to be flexible, if desired, as opposed to rigid as is requisite in couplings of the jaw type heretofore known.

Having now indicated, in a general way, the nature and purpose of my invention, I will proceed to a detailed description thereof with reference to the accompanying drawing in which there is illustrated a preferred embodiment shown in longitudinal cross section.

$a$ indicates a shaft driven from any suitable source of power and $b$ indicates a shaft to be coupled to the shaft $a$. $c$ and $d$ indicate coupling halves keyed securely on the ends of the shafts $a$ and $b$, being locked thereon by nuts $e$ threaded on reduced threaded end portions of the shafts. The coupling halves are provided with apertures arranged to be aligned, those in the coupling half $c$ being fitted with flexible bushings $f$, while those in the coupling half $d$ are fitted with ordinary metal bushings $g$. The coupling half $d$ is formed with an extended hub portion $d'$ upon which is slidably mounted a member $h$ which serves to support coupling pins $i$, the ends of which are chamfered as indicated in the drawing, and which extend through the bushings $g$ in the coupling half $d$ in positions for alignment with the bushings $f$ in the coupling half $c$ so that on movement of the member $h$ on hub portion $d'$ the pins may be entered and withdrawn from the bushings $f$. The chamfered ends of pins $i$ facilitate the entry of the pins into bushings $f$.

A ring $j$ encircles the member $h$ and is provided with oppositely extending pins $k$ which are engaged by the forked ends of a suitably pivoted shifter lever $l$ by the manipulation of which the member $h$ may be shifted to effect engagement or disengagement of pins $i$ in bushings $f$.

In the operation of the device, it will be observed that it is only necessary to position the member $h$ so that the pins $i$ will extend into bushings $f$ in order to connect the shafts $a$ and $b$ and it will be noted that when the shafts are so connected the drive from shaft $a$ to shaft $b$ will be transmitted from the fixed coupling half $c$ on drive shaft $a$, through pins $i$ to the fixed coupling half $d$ on shaft $b$ so that there will be no strain on the slidable member $h$, which will be subjected to wear only when shifted to make or break the connection between the coupling halves $c$ and $d$. Such wear as there may be will be upon the bushings $f$ and $g$, either or both of which may be readily replaced at slight expense.

When it is desired to disconnect the coupling, it is only necessary to shift member $h$ sufficiently to effect withdrawal of pins $i$ from bushings $f$, it being unnecessary to withdraw the pins from bushings $g$ in which the pins require only a minimum of clearance.

Having now fully described my invention, what I claim and desire to protect by Letters Patent is:—

1. A coupling for rotary members comprising coupling halves fixedly carried by said members respectively and provided with apertures arranged to be brought into alignment, a flexible bushing in the aperture in one of said coupling halves, a pin slidably mounted in the aperture in the other of said coupling halves, and means for sliding said pin into and out of engagement with said flexible bushing.

2. A coupling for rotary members comprising coupling halves fixedly carried by said members respectively and provided with apertures arranged to be brought into alignment, a flexible bushing in the aperture in one of said coupling halves, a pin slidably mounted in the aperture in the other of said coupling halves, said last named coupling half having a hub, and a member slidably mounted on said hub and carrying said pin for movement into and out of engagement with said flexible bushing.

In testimony of which invention, I have hereunto set my hand, at Trenton, New Jersey, on this 23d day of February, 1927.

ARVID PETERSON.